US005694346A

United States Patent [19]
Milano et al.

[11] Patent Number: 5,694,346
[45] Date of Patent: Dec. 2, 1997

[54] INTEGRATED CIRCUIT INCLUDING FULLY TESTABLE SMALL SCALE READ ONLY MEMORY CONSTRUCTED OF LEVEL SENSITIVE SCAN DEVICE SHIFT REGISTER LATCHES

[75] Inventors: Louis Christopher Milano; Michael Patrick Vachon, both of Endicott, N.Y.

[73] Assignee: International Business Machines Corporation, Armonk, N.Y.

[21] Appl. No.: 701,037

[22] Filed: Aug. 21, 1996

Related U.S. Application Data

[63] Continuation-in-part of Ser. No. 374,267, Jan. 18, 1995, abandoned.

[51] Int. Cl.$^6$ .............. G06F 17/14; H04N 7/12; H04N 11/02; H04N 11/04
[52] U.S. Cl. .............. 364/725; 348/407; 348/409; 348/412; 348/415; 371/22.5; 371/22.6
[58] Field of Search ................ 371/10.1–10.3, 371/21.1, 22.1–22.6; 348/406–419; 364/725, 726

[56] References Cited

U.S. PATENT DOCUMENTS

| | | | |
|---|---|---|---|
| 4,542,508 | 9/1985 | Moore | 371/22.6 |
| 4,580,216 | 4/1986 | Bellay et al. | 395/800 |
| 4,879,680 | 11/1989 | Luckett et al. | 365/78 |
| 5,163,023 | 11/1992 | Ferris et al. | 371/10.3 |
| 5,212,693 | 5/1993 | Chao et al. | 395/182.03 |
| 5,257,235 | 10/1993 | Miyamoto | 365/240 |
| 5,293,386 | 3/1994 | Muhmenthaler et al. | 371/10.3 |
| 5,416,520 | 5/1995 | Kuzma | 348/409 |
| 5,444,660 | 8/1995 | Yamanaka et al. | 365/189.12 |
| 5,576,765 | 11/1996 | Cheney et al. | 348/407 |

OTHER PUBLICATIONS

IBM TDB, vol. 34, No. 7A, Dec. 1991; "Level–Sensitive Scan Design Latch–Trigger Implementation Of Microprocessor Architecture".

IBM TDM, vol. 25, No. 3A, Aug. 1982; "Partitioning Microcode For A Microprocessor–Based Mainframe By ... ".

IBM TDB, vol. 21, No. 1, Jun. 1978; "Dynamic Random–Access Memory With Read–Only Memory Characteristics At Power–On Time".

Primary Examiner—Reba I. Elmore
Assistant Examiner—Emmanuel L. Moise
Attorney, Agent, or Firm—Richard M. Goldman

[57] ABSTRACT

Disclosed is an integrated microprocessor chip. The chip includes a digital video decoder Inverse Discrete Cosine Transform element and an on chip Read Only Memory. The on chip Read Only Memory includes (a) a shift register latch for receiving data from off chip pull-up resistors, (b) a register for storing data, (c) a selector and a decoder for selecting memory cells to be read from the register, and (d) a Read Only Memory data output.

1 Claim, 5 Drawing Sheets

INTEGRATED CIRCUIT INCLUDING FULLY TESTABLE SMALL SCALE READ ONLY MEMORY CONSTRUCTED OF LEVEL SENSITIVE SCAN DEVICE SHIFT REGISTER LATCHES

CROSS-REFERENCE TO RELATED APPLICATION

This is a continuation-in-part of our commonly assigned, U.S. application, Ser. No. 08/374,267, filed Jan. 18, 1995, now abandoned, for INTEGRATED CIRCUIT INCLUDING FULLY TESTABLE SMALL SCALE READ ONLY MEMORY CONSTRUCTED OF LEVEL SENSITIVE SCAN DEVICE SHIFT REGISTER LATCHES.

FIELD OF THE INVENTION

The invention relates to highly integrated chips having both (1) on-board ROM functionality and (2) microprocessor functionality. The ROM is characterized by being fully testable in a functional environment where LSSD shift register loads are not practical. The microprocessor is characterized by its use in a compute intensive digital video application.

BACKGROUND OF THE INVENTION

As the logic density of CMOS VLSI chips increases, the ability to move traditionally "off chip" functions, such as ROM, onto the CMOS microprocessor chip increases as well. For a microprocessor chip intended to operate with a minimum of support chips, i.e., one in which a Level Sensitive Scan Design (LSSD) scan to load patterns into shift register latches in functional mode is not available, the typical method of implementing a small on-chip ROM is with pull-up and pull-down resistors. When a "stuck-fault" model is used to evaluate circuit testability of such a structure, however, a multitude of untestable "stuck-faults" is evident.

A clear need exists for a fully testable alternative for testing small scale ROM implementations in a functional environment where LSSD shift register loads are not practical.

OBJECTS OF THE INVENTION

It is one object of the invention to provide a fully testable ROM element in a functional environment of an on-chip ROM integrated with a microprocessor, e.g., a digital video decoder microprocessor, where LSSD shift register loads are not practical.

It is a further object of the invention to provide for testing an on-chip ROM integrated with a microprocessor, e.g., a digital video decoder microprocessor, where LSSD shift registers are not practical.

SUMMARY OF THE INVENTION

These and other objects of the invention are attained by the highly integrated microprocessor chip of the invention. The microprocessor chip has both processor, e.g., a digital video decoder microprocessor, and ROM functionality integrated into one chip. That is, the microprocessor integrated circuit chip also comprises an on chip Read Only Memory. The on chip Read Only Memory has (a) a shift register latch for receiving data from a pull-up resistor, (b) a shift register latch ROM for storing data, (c) a selector and a decoder for selecting shift register latch memory cells to be read from the shift register latch ROM, and (d) a Read Only Memory data output.

The invention resides is a multifunctional microprocessor integrated circuit chip. The VLSI integrated circuit, intended for CMOS logic, includes a digital video decoder function and a read only memory (ROM) function.

The digital video decoder includes a first Huffman decoder for receiving variable length encoded digital video data and expanding the data, an inverse quantizer for receiving data from the first Huffman decoder and dequantiztng the data, an inverse discrete cosine transform transformer for receiving dequantizied data from the inverse quantizer and inverse discrete cosine transforming the data, a past frame storage and a future frame storage, both receiving inverse discrete cosine transformed data from the inverse discrete cosine transformer, a second Huffman decoder for receiving variable length encoded digital video data and expanding the data, a motion compensator for receiving data from (i) the second Huffman decoder, and (ii) the past frame storage and the future frame storage, and forming motion compensated image data therefrom, and a summer for summing image data from the motion compensator and the invesre discrete cosine transformer.

The on-chip shift register latch Read Only Memory is a look-up memory for the inverse discrete cosine transformer. The shift register latch Read Only Memory includes a first shift register latch for receiving input data from a pull-up resistor, a second shift register latch adapted for use as a read only memory cell for storing the input data from the first shift register latch, a selector and ROM address decoder for selecting shift register latch memory cells to be read from the shift register latch Read Only Memory to the inverse discrete cosine transformer, and a Read Only Memory data output to the inverse discrete cosine transformer.

THE FIGURES

The invention may be more fully understood by reference to the FIGURES.

DETAILED DESCRIPTION OF THE INVENTION

Figure 1:
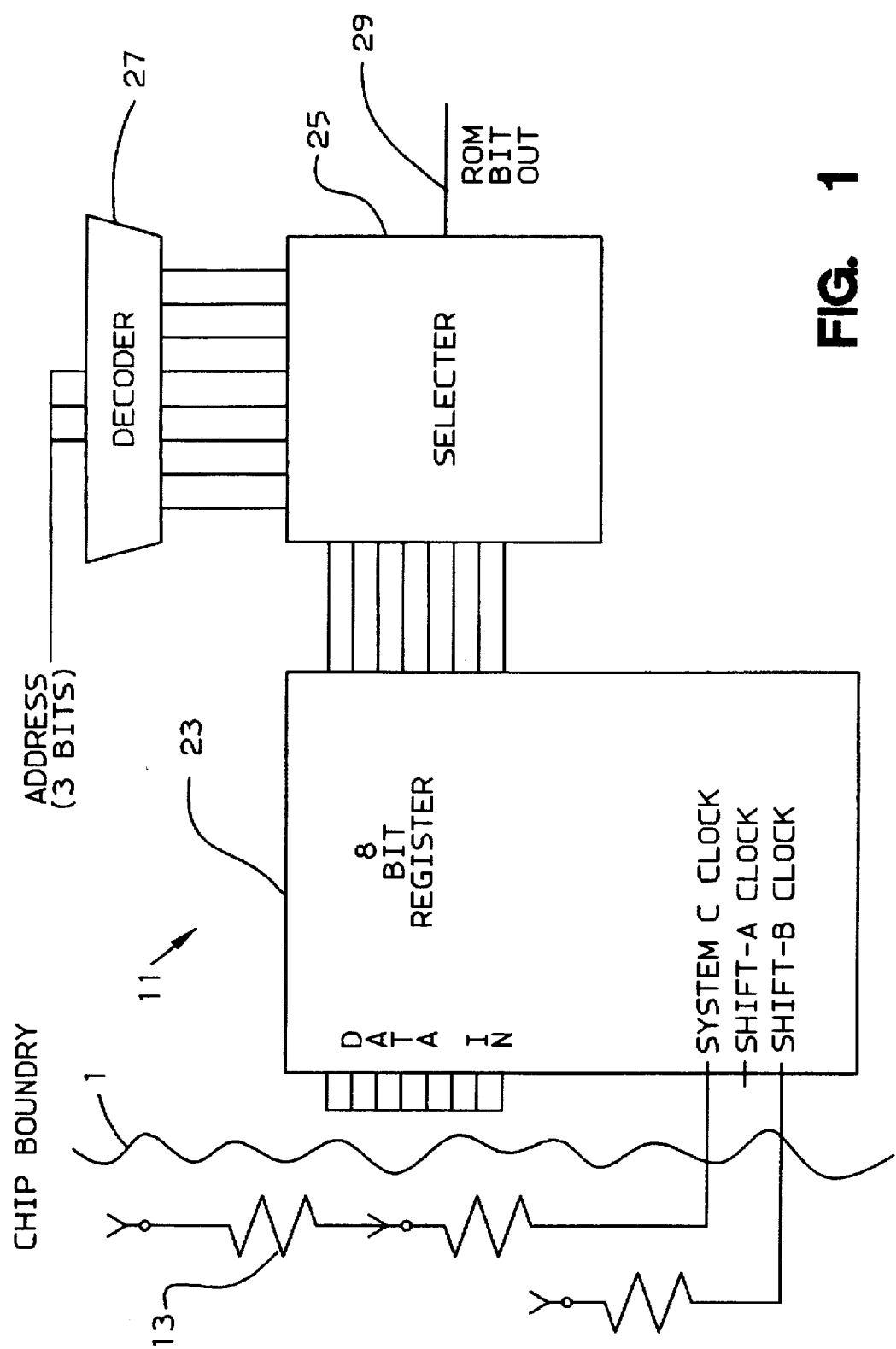
FIG. 1 shows the ROM circuitry of the integrated circuit chip generally.

The invention provides a fully testable, small scale, on-chip ROM (Read Only Memory) implementation in combination with a digital video decoder in a functional environment where LSSD shift register loading is not practical.

In stuck fault testing (which occurs after a chip has been fabricated) predefined data pattern sequences are driven into physically accessible probe points and the outputs are repeatedly measured and compared against a predicted output. The presence of a pull up or pull down resistor prevents stuck fault testing of the data path in which the resistors are located. This is a problem which our invention solves.

The invention is described with respect to an 8×1 bit ROM implementation that is part of an MPEG-2 compliant digital video decoder, although it is, of course, to be understood that other and larger implementations are contemplated. The ROM memory elements are implemented using an 8 bit register, with both positive and negative register outputs available for each bit. In the case of an 8×1 bit ROM, a 3 bit address is required to select the appropriate bit to propagate to the ROM output line. The ROM address decoder and the selector multiplexor are conventional.

The ROM is built up of shift register latches. Exemplary shift register latches are master-slave flip flops, for example, D flip flops. In the case of a master-slave D flip flop, L1 can be clocked and L2 can be slaved, to thereby capture the data. The ROM register data inputs for each bit are fed by a standalone shift register latch. The subsequent data port is fed by a single pull up resistor. The purpose of the single shift register latch is to buffer the multiple ROM register data ports from the stuck fault error introduced by the pullup resistor. By feeding the pull up resistor to a single latch, instead of directly to the ROM register, a reduction in untested stuck-faults from the number of ROM bits to 1 is achieved.

The actual ROM pattern is programmed, e.g., hardwired, into the circuit by feeding either the positive or negative register output of each ROM register into the selector and multiplexor.

After chip power on, the ROM data will be valid following two complete system clock cycles. This is because it takes two clock cycles for the shift register latch to load "1"'s into the data in ports of the 8 bit register. The 8 bit ROM register is accessed by sending an address and obtaining the ROM data from the selector. A service processor is not necessary to perform a scan to load data into the shift registers.

If the two cycle lag from chip power on to when ROM data is valid is not acceptable, the single shift register latch can be eliminated, and the pull-up resistor feeding the ROM register data inputs moved to the next package level. The result will be a single clock cycle time lag before the data is valid. Additionally, one remaining untestable stuck at fault will be eliminated. Since the pullup resistors are on a different package level, the chip, prior to final assembly, can be checked without the pull-up resistors being present.

If the implementation requires a zero lag before valid ROM data, the further modification of connecting the ROM register system clock and shift-B clock to the next package level pull-up resistors can be made.

FIG. 1 shows the overall circuitry of the ROM portion 11 of the integrated circuit chip, 1, with an eight bit register, 23, a selector, 25, a ROM address decoder, 27, and a ROM output, 29. An off-chip pullup resistor, 13, is also shown.

Figure 2:
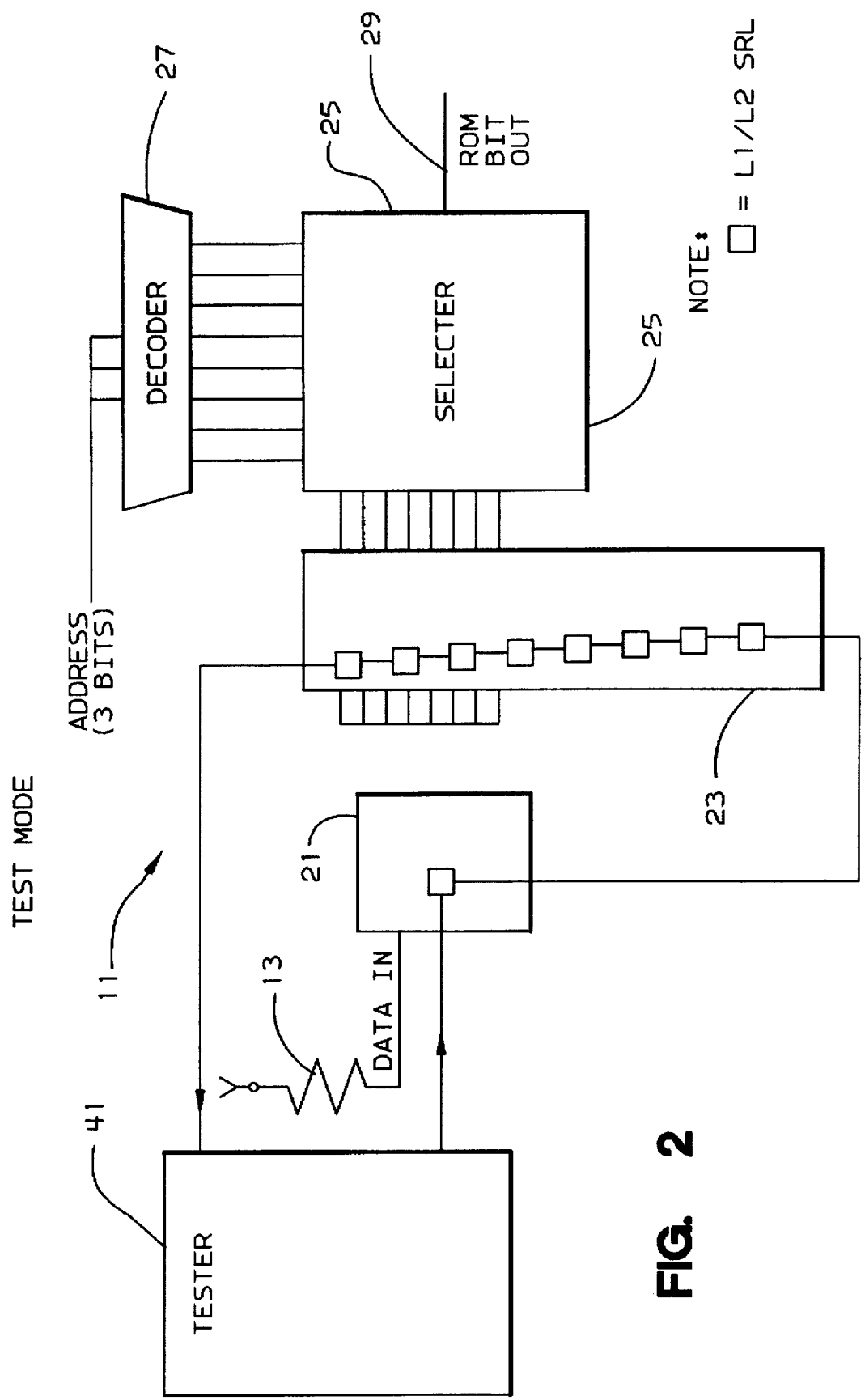
FIG. 2 shows the ROM circuitry of the integrated circuit chip in the test mode.

FIG. 2 shows the ROM circuitry, 11, configured in test mode. The tester, 41, can control the single bit shift register latch, 21, to load either a logical zero or a logical one into the data latches, 23a to 23h, of the eight bit register, 23. The tester, 41, also has control of loading the eight bit register, 23, with any combination of logical zeroes and ones to fully test the selector, 25, that the register, 23, feeds. It should be noted that in a true ROM implementation neither the tester, 41, nor the ROM hardware would be able to do this. The true ROM would only be capable of putting the specific combinations of logical zeroes and ones on its outputs that it contains. This would limit the ability to fully test the circuit that it feeds. Since the tester, 41, has the control to do this in the LSSD implementation shown in FIG. 2, it allows all of the circuitry contained in and around the ROM, 11, to be fully tested.

Figure 3:
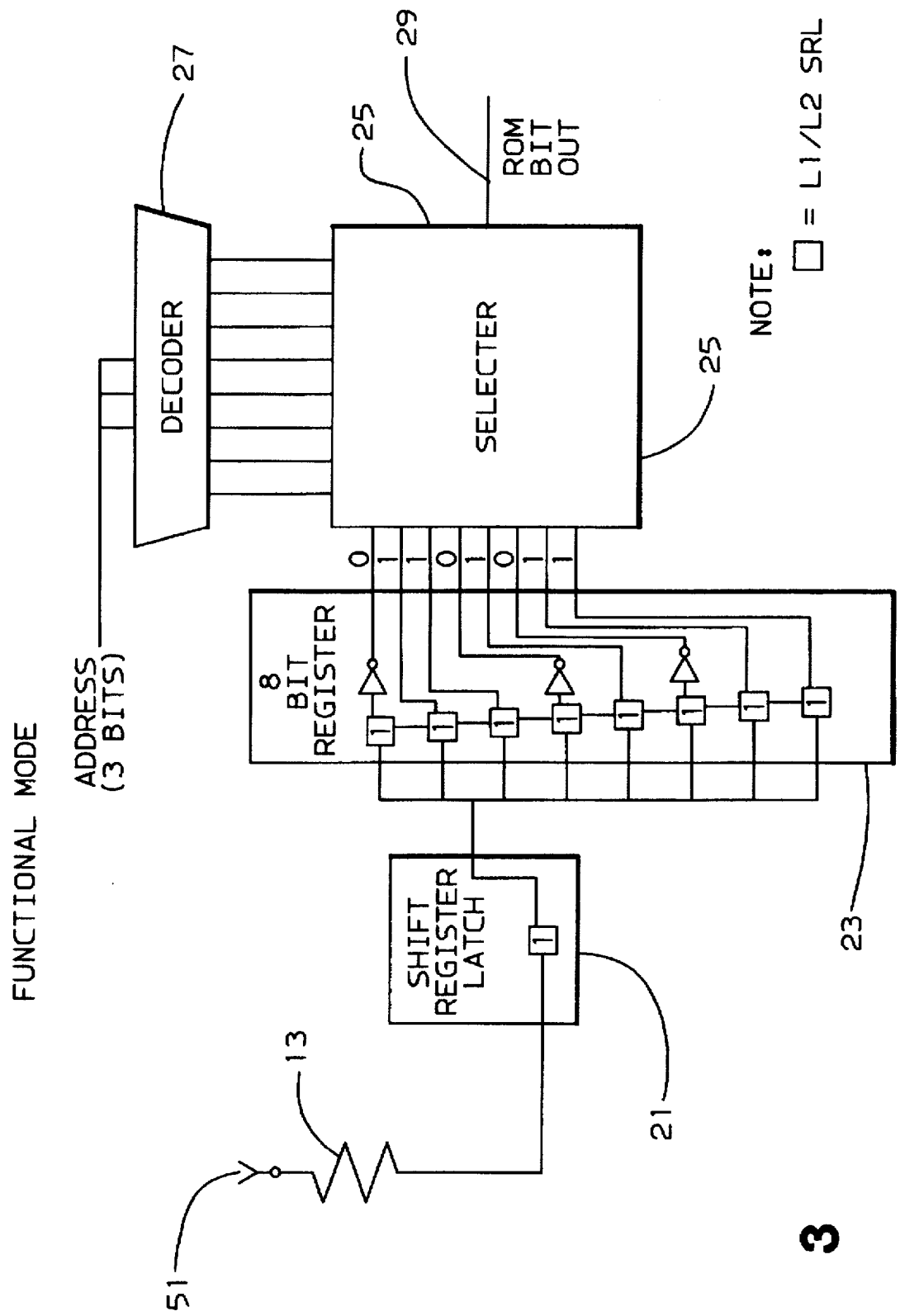
FIG. 3 shows the ROM circuitry of the integrated circuit chip in the functional mode.

FIG. 3 shows the ROM, 11, in the functional mode. In the functional mode the single bit shift register, 21, with its input latch tied to a voltage source, 51, through the pull up resistor, 13, is used to load the data bits of the eight bit register, 23. By using either the non-inverting or the inverting outputs of the shift register latches of the eight bit register, 23, the ROM data that is needed can be created.

According to the invention there is provided a one hundred percent stuck at fault testable implementation, with valid ROM data available within two clock cycles after chip power on.

Figure 4:
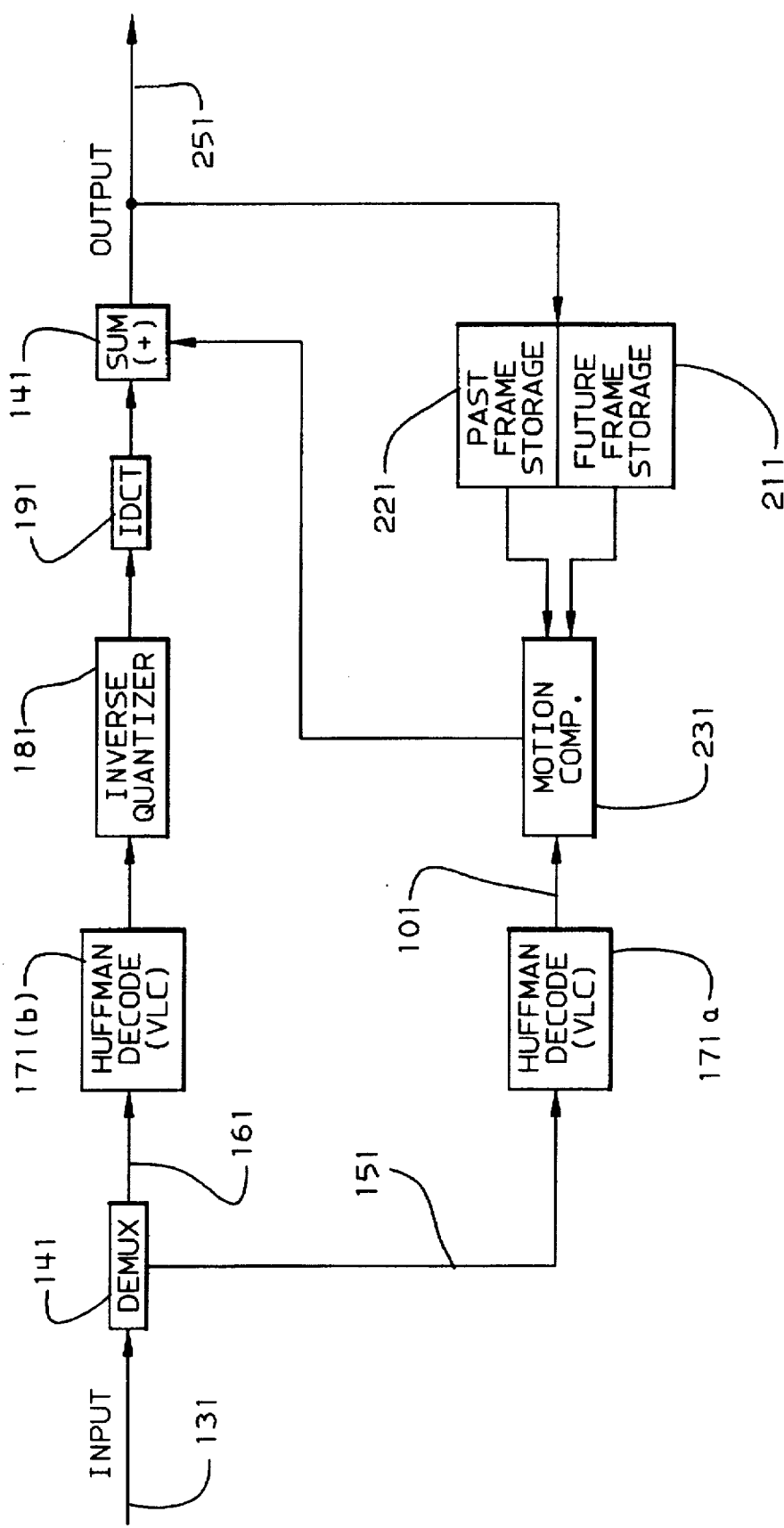
FIG. 4 shows a flow chart representation of the ROM circuitry of an integrated circuit chip including a generalized MPEG2 decoder.
Figure 5:
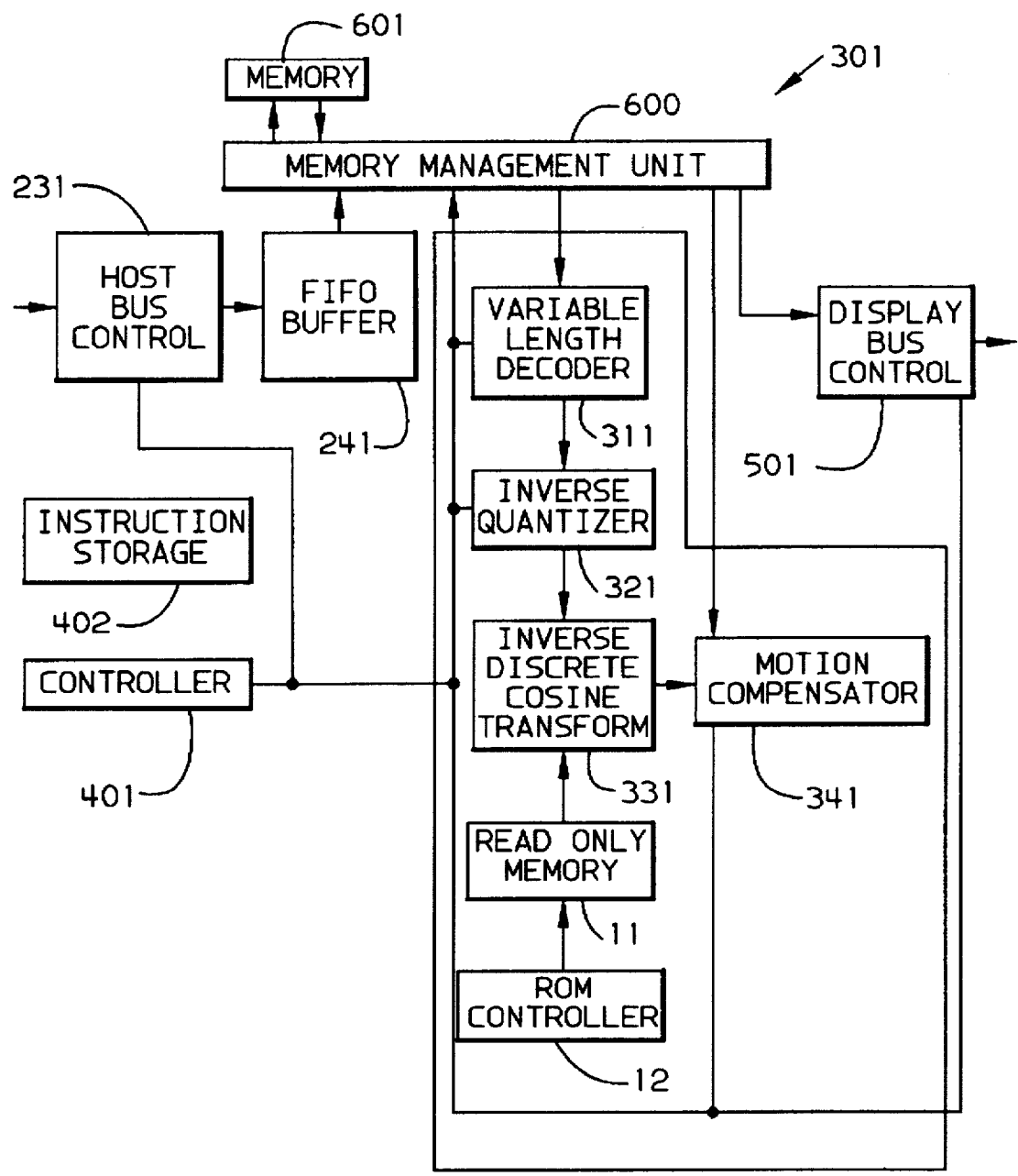
FIG. 5 is a logical flow diagram showing the general logical flow of the MPEG-2 Standard compliant decoder.

The shift register latch ROM of the invention is useful as an on-chip look-up table for an Inverse Discrete Cosine Transform (IDCT) MPEG-2 compliant encoder or decoder, as shown in FIGS. 4 and 5.

FIG. 4 shows the general internal data flow of the system to support the MPEG-2 Standard. Specifically, the compressed, encoded data input 131 goes to a demultiplexer 141 where it is demultiplexed into two streams 151 and 161. Stream 161 goes to a Variable Length Code (VLC) Huffman Decoder 171b for decoding, and to an Inverse Quantizer 181 for dequantizing. The dequantized code then goes to an Inverse Discrete cosine Transform (IDCT) process 191, where the dequantized code is transformed into a pixel mapping using the ROM 11 of the invention as a look-up table for constants, divisors, multipliers, and coefficients.

The second data stream 151 also goes through a Variable Length Code (VLC) Huffman Decoder 171a where it is decoded into error functions 101 which go to a Motion Compensator 231. The Huffman Decoders 171a and 171b are shown as logically separate and distinct, although they may structurally and electronically be the same element.

The Motion Compensator 231 also receives a data stream derived from the first data stream 161 and the motion compensated data stream, summed in Summer 241. The output 251 of the Summer 241 goes to the pixel bus (not shown) and to storage, i.e., Future Frame Storage 211 and Past Frame Storage 221. The contents of the Future Frame Storage 211 and Past Frame Storage 221 are, as appropriate, inputs to the Motion Compensator 231.

The decode unit 301, shown with detail in FIG. 5, consists of functional units that operate under the control of the decoder controller 401 and its associated Instruction Storage Unit 402. These decode functional units include the Variable Length Code Huffman Decoder 311, the Inverse Quantizer or Dequantizer, 321, the Inverse Discrete Cosine Transform unit, 331, including associated ROM, 11, and ROM controller, 12, and the Motion Compensation unit, 341.

The decoder controller 401 is the central point of control for the decoder. The decoder controller 401 microcode is stored in an Instruction Storage unit 402. The decoder controller 401 interacts with the host system through an external processor through the host or system bus for high level commands and status. The decoder controller 401 is responsible for the control and command of the other functional elements, as well as providing global synchronization of these units.

The decoder controller 401 is coupled to the Variable Length Code Huffman Decoder 311. This enables parsing of the code stream. Parsing of the code streams and processing of header information is done by the decoder controller 401 interacting with the VLC Huffman Decoder 311.

The Variable Length Code Huffman Decoder 311 (VLC) contains tables for decoding the data stream and a local state machine that controls the decoding of run/level data for macroblocks. The VLC 311 is controlled by the decoder controller 401 as header information and block run/level symbols are passed from the compressed bit stream. A local state machine decodes the run/level symbols and interacts with the Inverse Quantizer 321 to process the decoded signals.

To be noted is that variable length coding, e.g., Huffman coding, is a statistical coding technique that assigns codewords to symbols. Symbols with a high probability of occurrence are assigned short codewords, while symbols with a low probability of occurrence are assigned longer codewords.

The Inverse Quantizer 321 receives run/level (run/amplitude) coded symbols from the VLC unit 311 and outputs a block of 64 coefficients that are sent to the Inverse Discrete Cosine Transform Unit 331. The Inverse Quantizer 321 converts the run/level coded symbols to zeros and symbols, unzigs the data, handles differential pulse code modulation (DPCM) decoding for the Discrete Cosine coefficients, and dequantizes the data.

The Inverse Discrete Cosine Transform Unit 331 is a compute intensive element that uses certain coefficients, divisors, and multipliers repetitively in generating the inverse discrete cosine transform. These coefficients, divisors, and multipliers can be supplied by microcode or by the ROM 11. According to our invention they are supplied by the ROM 11. The ROM is logically connected to the Inverse Discrete Cosine Transform unit through a memory controller 12 and the decoder controller 401.

While the invention has been described with respect to certain preferred embodiments and exemplifications, it is not intended to limit the scope of the invention thereby, but solely by the claims appended hereto.

We claim:

1. A microprocessor chip comprising:
  (1) a digital video decoder including
    a. a first Huffman decoder for receiving variable length encoded digital video data and expanding the data;
    b. an inverse quantizer for receiving data from the first Huffman decoder and dequantizing the data;
    c. an inverse discrete cosine transformer for receiving dequantizied data from the inverse quantizer and inverse discrete cosine transforming the data;
    d. a second Huffman decoder for receiving variable length encoded digital video data and expanding the data;
    e. a motion compensator for receiving data from (i) the second Huffman decoder, and (ii) a past frame storage and a future frame storage, and forming motion compensated image data therefrom;
    f. a summer for summing image data from the motion compensator and the inverse discrete cosine transformer; and
    g. said past frame storage and said future frame storage, both receiving inverse discrete cosine transformed data from the summer; and
  (2) an on-chip shift register latch Read Only Memory as a look-up memory for the inverse discrete cosine transformer, said shift register latch Read Only Memory comprising:
    a. a first shift register latch for receiving input data from a pull-up resistor;
    b. a second shift register latch adapted for use as a read only memory cell for storing the input data from the first shift register latch;
    c. a selector and ROM address decoder for selecting shift register latch memory cells to be read from the shift register latch Read Only Memory to the inverse discrete cosine transformer; and
    d. a Read Only Memory data output from the shift register latch Read Only Memory to the inverse discrete cosine transformer.

* * * * *